(12) United States Patent
Wang

(10) Patent No.: US 12,081,859 B2
(45) Date of Patent: Sep. 3, 2024

(54) CAMERA MODULE STRUCTURE AND ELECTRONIC DEVICE

(71) Applicant: HONOR DEVICE CO., LTD., Shenzhen (CN)

(72) Inventor: Bo Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/926,946

(22) PCT Filed: May 16, 2022

(86) PCT No.: PCT/CN2022/092927
§ 371 (c)(1),
(2) Date: Nov. 21, 2022

(87) PCT Pub. No.: WO2023/016013
PCT Pub. Date: Feb. 16, 2023

(65) Prior Publication Data
US 2024/0187721 A1   Jun. 6, 2024

(30) Foreign Application Priority Data
Aug. 12, 2021 (CN) .......................... 202110924339.0

(51) Int. Cl.
*H04N 23/57* (2023.01)
*H04M 1/02* (2006.01)
*H04N 23/51* (2023.01)

(52) U.S. Cl.
CPC .......... *H04N 23/57* (2023.01); *H04M 1/0264* (2013.01); *H04N 23/51* (2023.01)

(58) Field of Classification Search
CPC ...... H04N 23/57; H04N 23/51; H04M 1/0264
See application file for complete search history.

(56) References Cited

U.S. PATENT DOCUMENTS 10,389,858 B2 * 8/2019 Yu ...................... H02K 41/0356
10,477,157 B1 * 11/2019 Shahdi ................... G06F 3/012
(Continued)

FOREIGN PATENT DOCUMENTS

CN           108418915 A       8/2018
CN           109683434 A       4/2019
(Continued)

*Primary Examiner* — Chiawei Chen
(74) *Attorney, Agent, or Firm* — WOMBLE BOND DICKINSON (US) LLP

(57) ABSTRACT

A camera module structure is provided which includes a mainboard, a first camera module, a second camera module, and a TOF device. The TOF device is located between the first camera module and the second camera module, which are respectively mounted to a first mounting portion and a second mounting portion that are hollowed-out via the brackets. The mainboard includes a spacing portion for separation between the first mounting portion and the second mounting portion. The TOF device is disposed on an upper surface of an auxiliary circuit board; the auxiliary circuit board is greater than the spacing portion in width; the auxiliary circuit board is located on an upper surface of the mainboard, and the auxiliary circuit board is connected to the mainboard and at least partially overlapped with the spacing portion; and the auxiliary circuit board is provided with a material removal portion on a lower surface.

20 Claims, 5 Drawing Sheets

(56) References Cited

U.S. PATENT DOCUMENTS

| | | | |
|---|---|---|---|
| 10,708,517 B2* | 7/2020 | Lee | H04N 23/76 |
| 2010/0328437 A1* | 12/2010 | Lee | G01C 11/06 |
| | | | 348/47 |
| 2013/0033581 A1 | 2/2013 | Woo et al. | |
| 2015/0371976 A1 | 12/2015 | Chang et al. | |
| 2020/0003870 A1* | 1/2020 | Chen | G01S 7/4813 |
| 2020/0221065 A1* | 7/2020 | Chen | H04N 13/296 |
| 2020/0241143 A1* | 7/2020 | Zhu | G01S 7/4815 |
| 2021/0075896 A1* | 3/2021 | Mao | H04M 1/18 |

FOREIGN PATENT DOCUMENTS

| | | |
|---|---|---|
| CN | 109714516 A | 5/2019 |
| CN | 110233951 A | 9/2019 |
| CN | 110297378 A | 10/2019 |
| CN | 110798550 A | 2/2020 |
| CN | 111567021 A | 8/2020 |
| CN | 111567021 B | 6/2021 |
| CN | 213661669 U | 7/2021 |
| CN | 113726995 A | 11/2021 |

* cited by examiner

CAMERA MODULE STRUCTURE AND ELECTRONIC DEVICE

CROSS-REFERENCE TO RELATED APPLICATIONS

This application is a national stage of International Application No. PCT/CN2022/092927, filed on May 16, 2022, which claims priority to Chinese Patent Application No. 202110924339.0, filed on Aug. 12, 2021. The disclosures of both of the aforementioned application are hereby incorporated by reference in their entireties.

TECHNICAL FIELD

This application relates to the field of TOF technologies, and in particular, to a camera module structure. The present invention also relates to an electronic device provided with the camera module structure.

BACKGROUND

In recent years, competition in the electronic device market has become more and more fierce, and consumers have higher and higher requirements for products. With continuous expansion of the application of the TOF (Time of flight) technology, a TOF image sensor has completed a technology evolution from CCD (Charge coupled device) to CMOS (Complementary Metal-Oxide-Semiconductor), and gradually becomes a standard configuration of many electronic products.

A display screen of a product such as a mobile phone or a tablet computer is provided with a camera region. To avoid an excessive impact of the camera region on a screen-to-body ratio of the display screen, so as to ensure that a consumer can obtain better experience, an area that is of the display screen and that is occupied by the camera region should be as small as possible.

Using a smartphone as an example, an edge portion of the display screen is generally provided with two or more front-facing camera modules, and these front-facing camera modules are mounted on a mainboard of the mobile phone. To narrow an opening of a camera region of a mobile phone screen, in addition to reducing sizes of the modules, another feasible design manner is to compress spacing between adjacent front-facing camera modules as much as possible.

A front-facing TOF device on a smartphone is usually disposed between two adjacent front-facing camera modules. If the spacing between brackets of the adjacent front-facing camera module is too small, a width of the TOF device is relatively large, and the spacing between the brackets of the adjacent front-facing camera module brackets is relatively small, and consequently, the TOF device cannot be placed. Therefore, limited by a size of the TOF device, using this method to reduce the area of the imaging area has reached its limit.

In view of the foregoing defect in a structure of the camera module, how to improve the structure of the camera module, to further reduce the area occupied by the camera region becomes a technical problem to be resolved by a person skilled in the art.

SUMMARY

An objective of this application is to provide a camera module structure. The camera module structure can further narrow an opening of a camera region, and reduce an area occupied by a TOF device when the TOF device is arranged on a mainboard.

Another objective of this application is to provide an electronic device provided with the camera module structure.

To achieve the foregoing objective, embodiments of this application provide a camera module structure. The camera module structure mainly includes a mainboard, a first camera module, a second camera module, and a TOF device, where the TOF device is located between the first camera module and the second camera module, the mainboard is provided with a first mounting portion and a second mounting portion that are hollowed-out, and the first camera module and the second camera module each are provided with a bracket and are respectively mounted to the first mounting portion and the second mounting portion via the brackets: and a spacing portion is formed between the first mounting portion and the second mounting portion, the TOF device is disposed on an auxiliary circuit board, a width of the auxiliary circuit board is greater than a width of the spacing portion, the auxiliary circuit board is located on an upper surface of the mainboard, and the auxiliary circuit board is connected to the mainboard and at least partially overlapped with the spacing portion.

The mainboard is provided with a mounting portion for mounting the first camera module and the second camera module, and the auxiliary circuit board is superposed on the spacing portion of the mainboard, and the TOF device is mounted via the auxiliary circuit board. Because the width of the auxiliary circuit board is greater than the width of the spacing portion, there is sufficient space for mounting the TOF device, so that the width of the spacing portion can be designed to be relatively small. That is, after spacing between the two camera modules is further compressed, the TOF device may still be mounted normally via the auxiliary circuit board with an unique shape, to further narrow an opening of the camera region, increase a screen-to-body ratio, improve consumer experience, and reduce an area occupied when the TOF device is arranged on the mainboard, so that an internal structure is more compact and reasonable.

Optionally, a region in which the auxiliary circuit board is overlapped with the bracket of the first camera module and/or a region in which the auxiliary circuit board is overlapped with the bracket of the second camera module are/is provided with a material removal portion whose depth is less than a thickness of the region on a lower surface, so that the auxiliary circuit board is partially suspended, and a portion in which the bracket of the first camera module and/or the bracket of the second camera module are/is overlapped with the auxiliary circuit board are/is accommodated via the material removal portion.

By disposing the material removal portion on the lower surface of the auxiliary circuit board, a portion in which the bracket of the first camera module and/or a portion in which the bracket of the second camera module are/is overlapped with the auxiliary circuit board may be accommodated via the material removal portion, thereby avoiding a structural conflict with the bracket of the camera module beyond the mainboard: in other words, the auxiliary circuit board and the TOF device can be normally mounted even if the bracket of the camera module is relatively high.

Optionally, the auxiliary circuit board is offset to the first camera module or the second camera module with respect to the spacing portion, and the material removal portion is located on one side of the auxiliary circuit board: or the auxiliary circuit board is centrally disposed with respect to the spacing portion, and the material removal portion is formed on each of two sides of the auxiliary circuit board.

Optionally; the material removal portion is located in a corner region of a lower surface of the auxiliary circuit board, and a non-material removing portion of the lower surface of the auxiliary circuit board is in an "L" shape or a "L" shape.

Optionally, a length of the material removal portion is ½ to ⅘ of a length of the auxiliary circuit board.

Optionally, the material removal portion is 0.2-0.5 mm in depth.

Optionally, a lower surface of the auxiliary circuit board is provided with solder joints on a non-material removing portion, and is electrically connected to the mainboard via the solder joints.

Optionally, a material removal portion of the auxiliary circuit board is a non-wiring region, and a partially suspended portion of the auxiliary circuit board is a wiring region.

Optionally, a sum of a thickness of the TOF device and a thickness of the auxiliary circuit board is less than or equal to a height of the first camera module and the second camera module beyond the mainboard.

Optionally, the auxiliary circuit board is in a rectangular shape, an upper half portion of the auxiliary circuit board is partially overlapped with the spacing portion, and a lower half portion of the auxiliary circuit board extends beyond the spacing portion.

Optionally, the auxiliary circuit board includes at least two layers of circuit boards which are overlapped, a lower-layer circuit board includes a notch corner, to form a material removal portion, and the TOF device is disposed on an upper-layer circuit board: and the upper-layer circuit board is electrically connected to the lower-layer circuit board, and the lower-layer circuit board is electrically connected to the mainboard.

To achieve the another objective, this application provides an electronic device, including a housing and a display screen, where the housing and/or the display screen are/is provided with a camera region, the camera region is provided with a camera module, and the camera module has any one of the foregoing camera module structures.

The electronic device provided in this application is provided with the camera module structure. Because the camera module structure has the foregoing technical effect, the electronic device with the camera module structure should also have the corresponding technical effect.

Figure 1:
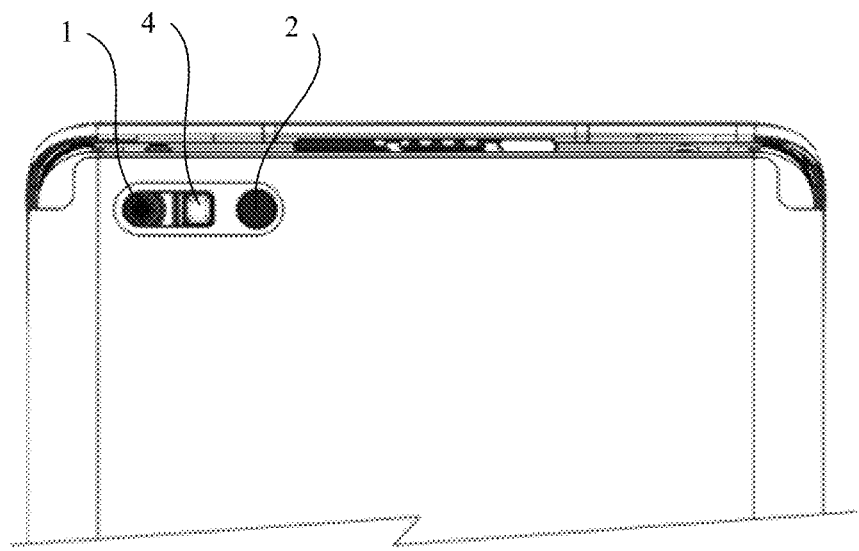
FIG. 1 is a schematic diagram of a portion of a smartphone provided with a camera module structure according to an embodiment of this application.

In the figures:
1. First camera module 11. First bracket 2. Second camera module 21. Second bracket 3. Mainboard 31. First mounting portion 32. Second mounting portion 4. TOF device 41. TOF lamp 42. Driver IC 43. Peripheral capacitor and resistor 5. Spacing portion 6. Auxiliary circuit board 61. Material removal portion 62. Non-material removing portion 63. Solder joint

DESCRIPTION OF EMBODIMENTS

To enable a person skilled in the art to better understand solutions in this application, the following describes in detail this application with reference to accompanying drawings and specific implementations.

Terms such as "upper", "lower", "inner", and "outer" are defined herein based on positional relationships shown in the accompanying drawings. Depending on different accompanying drawings, the corresponding positional relationships may also change, and therefore cannot be interpreted as an absolute limitation to the protection scope. Terms such as "first", and "second" are only used to distinguish one component from another with a same name, and does not necessarily require or suggest that there are any actual relationship or order between these components.

As shown in FIG. 1, this embodiment provides a camera module structure applied to a smartphone. The smartphone is provided with a camera region at an upper edge position of a display screen of the smartphone, and the camera region is offset to a left side (certainly, the camera region may also be centered or offset to a right side). Because a dual-camera mode is enabled, a first camera module 1 and a second camera module 2 are provided inside the camera region. To enhance a camera function, a TOF device 4 is further provided. A TOF technology belongs to one of two-way ranging methods. A basic principle is that a time difference exists in this process in which a light pulse is continuously sent to a target, and then light returned from an object is received by a sensor, so that a distance between a transmitter and the measured object is calculated, and the TOF device is added, so that the camera module can fast and remotely obtain depth-of-field information with higher accuracy, thereby completing a wider range of 3D modeling.

Because the camera region occupies a normal display region of the display screen, generally, an area of the camera region should be as small as possible. Although an area occupied by two adjacent front-facing camera modules can be reduced by compressing lateral spacing between the two adjacent front-facing camera modules, if spacing between the first camera module 1 and the second camera module 2 is too small, the TOF device cannot be normally mounted.

For this problem, a camera module structure is redesigned in this application, and in the camera module structure, a TOF device can still be mounted between two adjacent camera modules when spacing between the camera modules is relatively small, thereby further narrowing an opening of the camera region and increasing a screen-to-body ratio.

Figure 2:
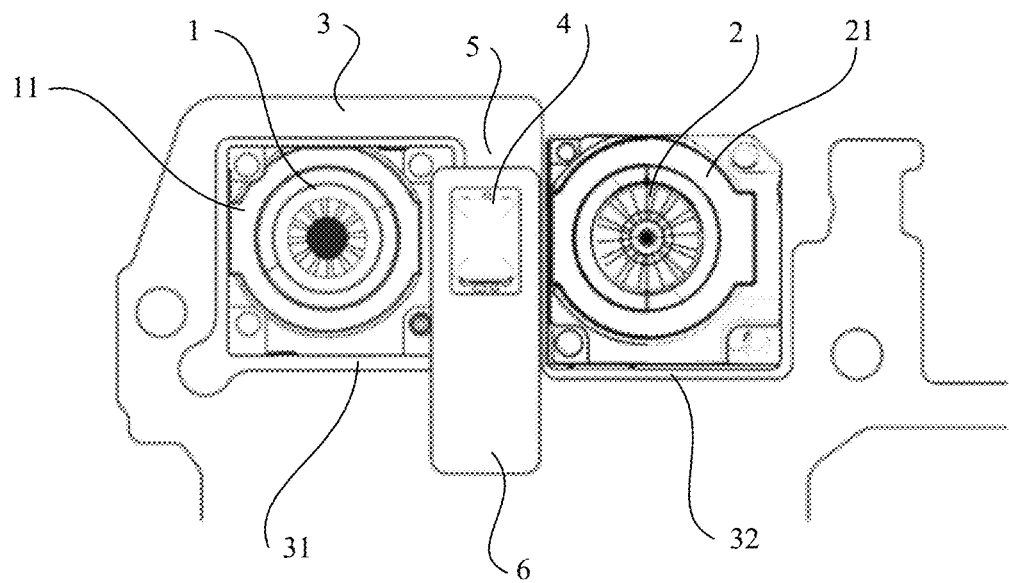
FIG. 2 is a schematic a front view of a camera module structure disclosed in an embodiment of this application.
Figure 3:
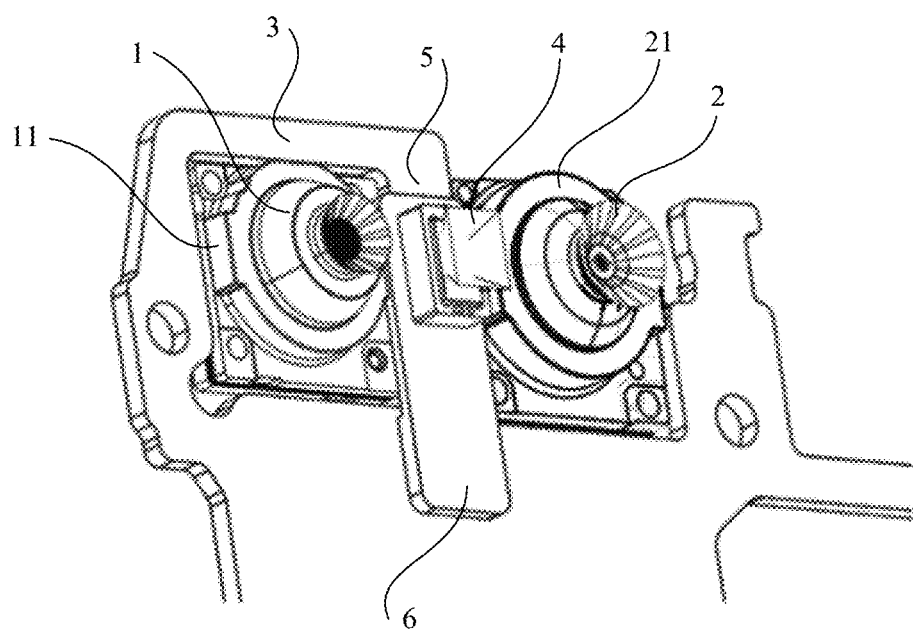
FIG. 3 is an isometric view of the camera module structure shown in FIG. 2.

As shown in FIG. 2 and FIG. 3, specifically, this camera module structure mainly includes a mainboard 3 and a first camera module 1, a second camera module 2, a TOF device 4, and the like that are disposed on the mainboard 3.

The first camera module 1 and the second camera module 2 together form dual lenses, to implement a front-facing camera function. The TOF device 4 is located between the first camera module 1 and the second camera module 2, and the mainboard 3 is provided with a first mounting portion 31 and a second mounting portion 32 that are hollowed-out. The first camera module 1 is provided with a first bracket 11, the second camera module 2 is provided with a second bracket 21, and the first camera module 1 and the second camera module 2 are respectively mounted on the first mounting portion 31 and the second mounting portion 32 via the first bracket 11 and the second bracket 21: projection shapes of the brackets of the first camera module 1 and the second camera module 2 are as shown in FIG. 2: and shapes of the first mounting portion 31 and the second mounting portion 32 that are hollowed-out are as shown in FIG. 3, and are adapted to the brackets of the first camera module 1 and the second camera module 2, so that the first mounting portion 31 and the second mounting portion 32 can be placed in the brackets of the first camera module 1 and the second camera module 2.

By disposing the first mounting portion 31 and the second mounting portion 32 that are hollowed-out on the mainboard 3, the two camera modules can be located in the mainboard 3 after mounting, and a height of the camera module is reduced as much as possible, so that the brackets of the two camera modules only extend beyond the mainboard 3 by a relatively small distance, thereby creating an advantageous condition for mounting an auxiliary circuit board 6. The auxiliary circuit board 6 is an added circuit board with a relatively small volume, and is connected to the mainboard 3 and located between the first camera module 1 and the second camera module 2. Via the auxiliary circuit board 6, the TOF device 4 can still be mounted when spacing between the first camera module 1 and the second camera module 2 is relatively small, thereby reducing an area occupied by the entire camera module structure.

Figure 4:
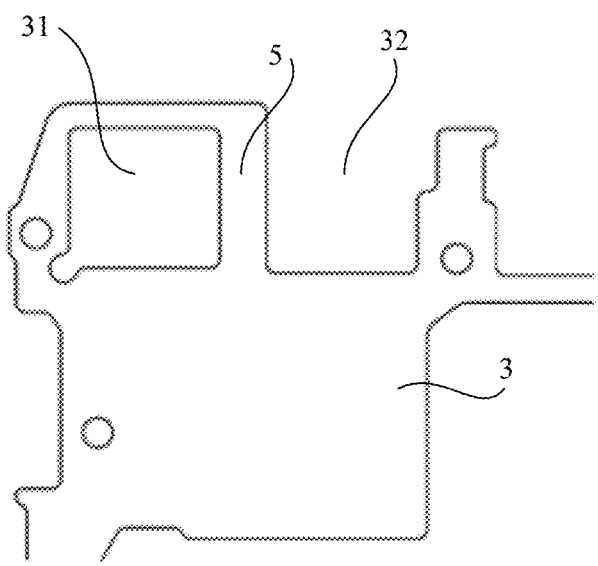
FIG. 4 is a schematic diagram of a structure of a portion of a mainboard shown in FIG. 2.

The first mounting portion 31 on the mainboard 3 is in a circumferential closed shape, and the second mounting portion 32 adjacent to the first mounting portion 31 is in an upper open shape (see FIG. 4). The first mounting portion 31 and the second mounting portion 32 are spaced from each other via a vertical spacing portion 5. The auxiliary circuit board 6 is substantially in a rectangular shape and has a width greater than a width of the spacing portion 5. The auxiliary circuit board 6 is located on an upper surface of the mainboard 3. An upper half portion of the auxiliary circuit board 6 and the spacing portion 5 are partially overlapped. A lower half portion of the auxiliary circuit board 6 extends beyond the spacing portion 5 and is overlapped with a part of the mainboard that is outside the spacing portion 5. The TOF device 4 is mounted on an upper surface of the auxiliary circuit board 6. During assembly, the TOF device 4 is mounted on the mainboard 3 via the auxiliary circuit board 6 and is electrically connected to the mainboard 3 via the auxiliary circuit board 6 (see FIG. 5).

Figure 5:
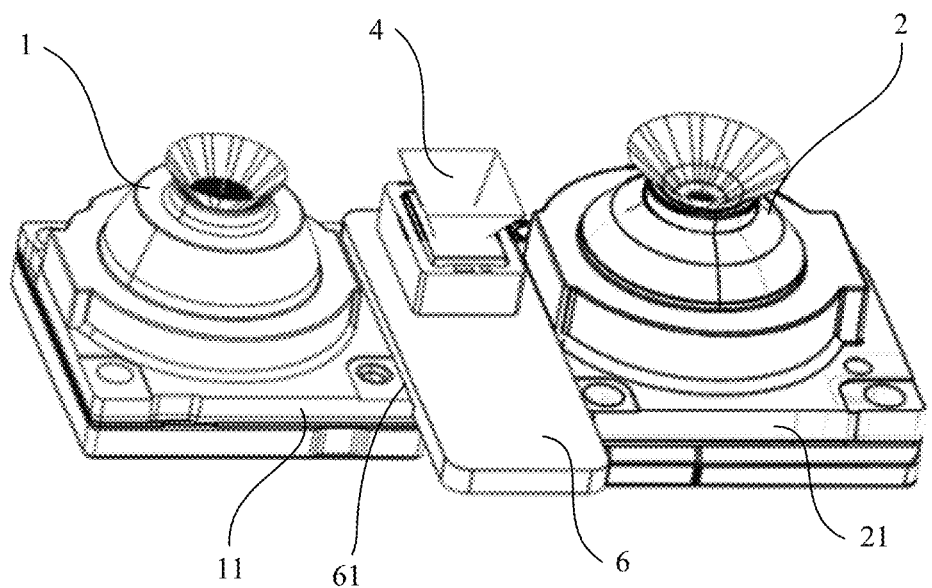
FIG. 5 is a schematic diagram of a position relationship between an auxiliary circuit board provided with a TOF device and each of a first camera module and a second camera module.

Still referring to FIG. 5, cameras and the brackets of the first camera module 1 and the second camera module 2 are generally an integral structure. During assembly, the first camera module 1 and the second camera module 2 each are first placed in the first mounting portion 31 and the second mounting portion 32, and then the auxiliary circuit board 6 is mounted. A left side of the auxiliary circuit board 6 is partially overlapped with the first bracket 11 of the first camera module 1, a region in which the auxiliary circuit board 6 is overlapped with the first bracket 11 is provided with an material removal portion 61 whose depth is less than a thickness of the region on a lower surface, and the auxiliary circuit board 6 can be partially suspended by the material removal portion 61, so that a portion in which the first bracket 11 is overlapped with the auxiliary circuit board 6 is accommodated by the material removal portion 61, to avoid a structural conflict between the auxiliary circuit board 6 and the first bracket 11.

It is not difficult to understand that the mainboard of the smartphone also includes another part. Because improvement of this application is mainly concentrated in the camera region, only a structure of a portion of the mainboard corresponding to the camera region is shown in the accompanying drawings, and the another part of the mainboard is omitted.

Figure 6:
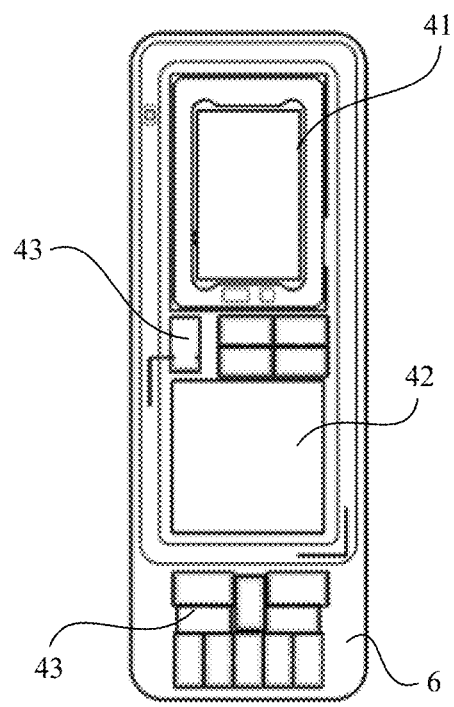
FIG. 6 is a front view of the auxiliary circuit board and the TOF device shown in FIG. 5.
Figure 7:
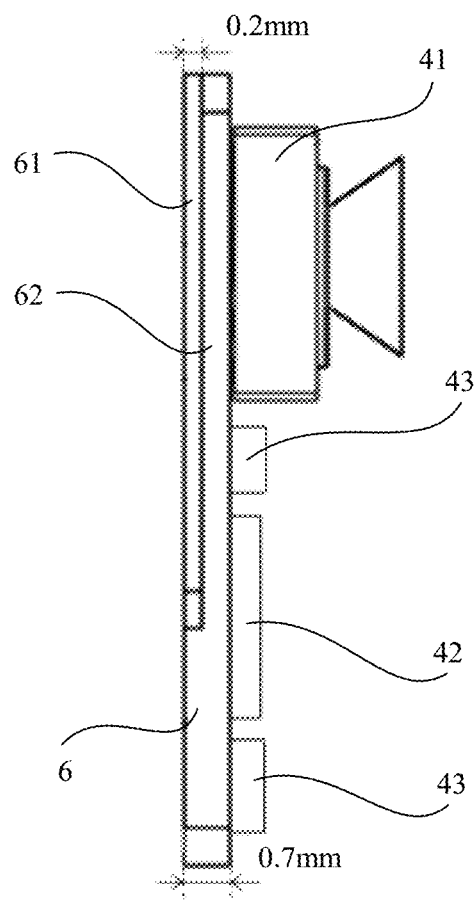
FIG. 7 is a side view of the auxiliary circuit board and the TOF device shown in FIG. 5.
Figure 8:
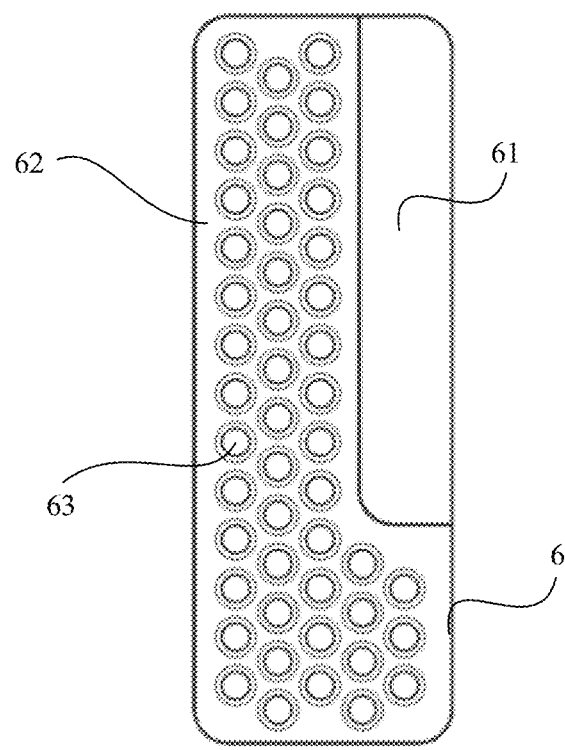
FIG. 8 is a rear view of the auxiliary circuit board and the TOF device shown in FIG. 5.

Refer to FIG. 6 to FIG. 8. FIG. 6 is a front view of the auxiliary circuit board and the TOF device shown in FIG. 5; FIG. 7 is a side view of the auxiliary circuit board and the TOF device shown in FIG. 5: and FIG. 8 is a rear view of the auxiliary circuit board and the TOF device shown in FIG. 5.

In this embodiment, the camera of the first camera module 1 is offset to the left side with respect to the first bracket 11, and the camera of the second camera module 2 is offset to the left side with respect to the second bracket 21, and therefore, to ensure that the TOF device 4 is in a middle position between the first camera module 1 and the second camera module 2, the auxiliary circuit board 6 is offset to the left side with respect to the spacing portion 5, and a right side of the auxiliary circuit board 6 is substantially aligned with a right side of the spacing portion 5, so as to avoid a structural conflict with the second bracket 21 of the second camera module 2. Therefore, the material removal portion 61 is formed only on the left side of the auxiliary circuit board 6 is formed.

Specifically, when viewed from the rear view of the auxiliary circuit board 6 (namely, the view of FIG. 8), the material removal portion 61 is substantially in a vertical rectangular shape, is located on a right side of the lower surface of the auxiliary circuit board 6, and is in an upper corner region.

For different products, areas of the auxiliary circuit board 6 overlapped with the first bracket 11 are different. Therefore, the area of the material removal portion 61 also changes. For example, a length of the material removal portion 61 may be ½ to ⅘ of a length of the auxiliary circuit board 6, and a width of the material removal portion 61 may be ⅓ to ½ of the width of the auxiliary circuit board 6.

The material removal portion of the auxiliary circuit board 6 is a non-wiring region, and a partially suspended portion (that is, a portion whose thickness becomes thinner) corresponding to the material removal portion 61 may be a wiring region. The lower surface of the auxiliary circuit board 6 are provided with solder joints 63 in a non-material removing portion 62, and is electrically connected to the mainboard 3 via the solder joints 63, and the solder joints 63 are densely distributed on the lower surface of the auxiliary circuit board 6 in a form of a dot matrix.

If the partially suspended portion of the auxiliary circuit board 6 needs to be wired, a device on the upper surface and the solder joints 63 on the lower surface can be connected through an internal direction-changing circuit, that is, the whole upper surface of the auxiliary circuit board 6 can be provided with connecting points, and connecting points on the lower surface are concentrated on the non-material removing portion 62. The connecting points on the upper surface and the connecting points on the lower surface are conducted on the circuit through the direction-changing circuit inside the auxiliary circuit board 6. To avoid that an excessive depth of the material removal portion 61 affects an internal wiring of the partially suspended portion, a depth of the material removal portion 61 can be controlled within 0.2-0.5 mm. In this embodiment, a thickness of the auxiliary circuit board 6 is 0.7 mm, and the depth of the material removal portion 61 is 0.2 mm (see FIG. 7).

If the partially suspended portion of the auxiliary circuit board 6 is a non-wiring region, is mainly configured to support the TOF device 4, and serves as a mounting foundation for the TOF device 4, the depth of the material removal portion 61 may be designed to be relatively large, for example, may be 0.3 mm. 0.4 mm, or another value, provided that structural strength of the partially suspended portion is not affected.

After the auxiliary circuit board 6 is added onto the spacing portion 5 of the mainboard 3, a cross-sectional thickness of a portion thereof will be a sum of a thicknesses of the mainboard 3, the thicknesses of the auxiliary circuit board 6 and a thicknesses of the TOF device 4, and a sum of the thicknesses of the TOF device 4 and the thicknesses of the auxiliary circuit board 6 should be less than or equal to a height of the first camera module 1 and the second camera module 2 beyond the mainboard 3, so that the TOF device 4 does not exceed a height limit. In this embodiment, the thickness of the auxiliary circuit board 6 is less than the thickness of the mainboard 3, so that a height of the TOF device 4 does not exceed the height of the first camera module 1 and the height of the second camera module 2.

The TOF device 4 on the auxiliary circuit board 6 mainly includes a TOF lamp 41, a driver IC42, and peripheral capacitor and resistor 43. The TOF lamp 41 occupies ⅓ of the region of the auxiliary circuit board 6, the driver IC42 occupies a lower center region of the auxiliary circuit board 6, and a region between the TOF lamp 41 and the driver IC42 and a lower region of the driver IC42 are used to dispose the peripheral capacitor and resistor 43 (see FIG. 6).

In another embodiment, the auxiliary circuit board 6 may be centrally disposed with respect to the spacing portion 5, and the material removal portion 61 is formed on each of two sides of the auxiliary circuit board 6, and the material removal portion 61 on the left side corresponds to the first bracket 11, so that the structural conflict with the first bracket 11 can be avoided, and the material removal portion 61 on the right side corresponds to the second bracket 21, so that the structural conflict with the second bracket 21 can be avoided. When viewed from the rear view of the auxiliary circuit board 6, each of the material removal portions 61 is substantially in a vertical rectangular shape, is located on the left side or the right side of the lower surface of the auxiliary circuit board 6, and is in the upper corner region. Because two material removal portions 61 are disposed on the left side and the right side, the non-material removing portion 62 on the lower surface of the auxiliary circuit board 6 is in a "L" shape. The widths of the left and right material removal portions 61 are relatively narrow: and a sum of the widths may be equal to the width of the material removal portion 61 in the foregoing first embodiment, and the other structures are substantially the same as those in the first embodiment. Please refer to the foregoing descriptions. This structure is suitable for a case in which cameras of two camera modules are not offset from the bracket: in other words, the cameras of the camera modules are located in a center of the bracket, and geometric centers thereof coincide with each other.

In still another embodiment, the auxiliary circuit board 6 may be disposed and offset to the right side with respect to the spacing portion, and the material removal portion 61 is formed on the right side of the auxiliary circuit board 6, so that the structural conflict with the second bracket 21 can be avoided. When viewed from the rear view of the auxiliary circuit board 6, the material removal portion 61 is substantially in a vertical rectangular shape, is located on the left side of the lower surface of the auxiliary circuit board 6, and is in the upper corner region. The rest of the structure is substantially the same as that in the first embodiment. Please refer to the foregoing descriptions. This structure is suitable for a case in which the cameras of the two camera modules are offset to the right side with respect to the bracket.

In another embodiment, an upper end and a lower end of the auxiliary circuit board 6 each may extend beyond the spacing portion 5 and then be connected to the mainboard 3. In this structure, the material removal portion 61 on the left side and/or the material removal portion 61 on the right side of the auxiliary circuit board 6 mainly occupy/occupies a middle portion except the two ends of the auxiliary circuit board 6. When viewed from the rear view of the auxiliary circuit board 6. If the material removal portion 61 is located on the left side of the auxiliary circuit board 6, the non-material removing portion 62 on the auxiliary circuit board 6 is in a "]" shape: or if the material removal portion 61 is located on the right side of the auxiliary circuit board 6, the non-material removing portion 62 on the auxiliary circuit board 6 is in a "[" shape: or if material removal portions 61 are located on the left side and the right side of the auxiliary circuit board 6, the non-material removing portion 62 on the auxiliary circuit board 6 is in an "I" shape. In this structure, the auxiliary circuit board 6 has a larger overlapped area with the mainboard 3. On the one hand, connection strength between the two can be improved, and on the other hand, the auxiliary circuit board 6 of a larger size may adapt to various types of TOF devices 4, to facilitate circuit design, so as to better implement electrical connection.

The material removal portion 61 on the auxiliary circuit board 6 may be processed and manufactured in various ways. The material removal portion 61 may be formed integrally with the auxiliary circuit board 6; or the auxiliary circuit board 6 may be formed first, and then, the material removal portion 61 may be processed and formed based on the auxiliary circuit board 6 through a subsequent process, for example, a partially material of the auxiliary circuit board 6 may be milled off via a cavity process, so as to form the required material removal portion 61.

In addition, the auxiliary circuit board 6 may be formed by overlapping at least two layers of circuit boards. Specifically, a structure of the auxiliary circuit board 6 may be a pressed two-layer, three-layer, or four-layer structure. For example, in a two-layer overlapped circuit board, a lower-layer circuit board is a rectangular circuit board with a notch corner, and an upper-layer circuit board is a complete rectangular circuit board. In this way, after two layers of circuit boards are overlapped, the notch corner of the lower-layer circuit board may form the material removal portion 61, and the TOF device 4 is disposed on the upper-layer circuit board, the upper-layer circuit board and the lower-layer circuit board are electrically connected, and the lower-layer circuit board and the mainboard 3 are further electrically connected, so that the TOF device 4 and the mainboard 3 are electrically connected.

The forgoing embodiment is merely a preferred solution of this application, and is not specifically limited thereto. Based on this solution, a targeted adjustment may be made based on an actual requirement, to obtain different implementations. For example, in addition to a mode of front-facing dual lenses, the solution may also be applicable to a mode of three lenses (an ultra wide angle lens, a zoom lens, and a main camera lens), a mode of four lenses (an ultra wide angle lens, a zoom lens, a main camera lens, and a depth of field auxiliary lens) or a mode of five lenses (an ultra wide angle lens, a zoom lens, a main camera lens, a depth of field auxiliary lens, and another lens), so that a third camera module, a fourth camera module, and a fifth camera module are further provided. Alternatively, the first camera module 1 and the second camera module 2 are disposed up and down, and in this case, the auxiliary circuit board 6 is also adjusted to be disposed laterally, and so on. Since there are many possible implementation manners, examples are not described herein again.

As shown in FIG. 3 and FIG. 5, in the camera module structure provided in this application, by disposing hollowed-out mounting portions for the first camera module 1 and the second camera module 2, so that brackets of the two camera modules only extend beyond the mainboard 3 by a small distance after the two camera modules are mounted on the mainboard 3. The TOF device 4 is mounted by superimposing the auxiliary circuit board 6 on the spacing portion 5. Because the width of the auxiliary circuit board 6 is greater than the width of the spacing portion 5, there is sufficient space for mounting the TOF device 4, and the lower surface of the auxiliary circuit board 6 is provided with the material removal portion 61, and a portion in which the bracket of the first camera module 1 and/or the bracket of the bracket of the second camera module 2 are/is overlapped with the auxiliary circuit board 6 may be accommodated via the material removal portion 61, thereby avoiding a structural conflict with the bracket of the camera module beyond the mainboard 3. In this way, the width of the spacing portion 5 may be designed to be relatively small: to be specific, after the spacing between the two camera modules is further compressed, the TOF device 4 may still be normally mounted via the auxiliary circuit board 6 with the foregoing structure, thereby further narrowing the opening of the camera region. This is applicable to both the front-facing camera module and the rear-facing camera module.

As shown in FIG. 1, when the camera module structure is applied to the front-facing camera module of the smartphone, because the spacing between the first camera module 1 and the second camera module 2 is further reduced, a lateral length that is of the front-facing camera module that is visible from the outside becomes smaller accordingly, to reduce an area that is of an upper left corner region of a screen and that is occupied by the entire front-facing camera module, and an area of a screen display region is further increased. This ensures a camera function and camera quality, increases a screen-to-body ratio, thereby improving use experience of a consumer. In addition, this reduces an area occupied by the TOF device 4 when the TOF device 4 is arranged on the mainboard 3, so that an internal structure is more compact and reasonable.

In addition to the camera module structure, this application further provides an electronic device. The electronic device may be specifically a mobile phone (see FIG. 1), a tablet computer, a wearable device, a vehicle-mounted device, an augmented reality (augmented reality, AR)/virtual reality (virtual reality. VR) device, a notebook computer, an ultra-mobile personal computer (ultra-mobile personal computer. UMPC), a netbook, a personal digital assistant (personal digital assistant. PDA), and the like. The electronic device includes a housing and a display screen, and the housing and/or the display screen are/is provided with a camera region. The camera module structure described above is provided in the camera region. For another structure of the electronic device, refer to the conventional technology. Details are not described herein again.

The foregoing describes the camera module structure and the electronic device provided in this application in detail. A principle and an implementation of this application are described herein based on specific examples. The descriptions about the embodiments are merely provided to help understand a core idea of this application. It should be noted that a person of ordinary skill in the art may make several improvements or modifications without departing from the principle of this application, and the improvements or modifications shall fall within the protection scope of this application.

The invention claimed is:

1. A camera module structure, comprising:
a mainboard, a first camera module, a second camera module, and a time of flight (TOF) device, wherein the TOF device is located between the first camera module and the second camera module, the mainboard is provided with a first mounting portion and a second mounting portion that are hollowed-out, and the first camera module and the second camera module each are provided with a bracket and are respectively mounted to the first mounting portion and the second mounting portion via the brackets; and the mainboard comprises a spacing portion for separation between the first mounting portion and the second mounting portion, the TOF device is disposed on an upper surface of an auxiliary circuit board, a width of the auxiliary circuit board is greater than a width of the spacing portion, the auxiliary circuit board is located on an upper surface of the mainboard, and the auxiliary circuit board is connected to the mainboard and at least partially overlapped with the spacing portion.

2. The camera module structure according to claim 1, wherein a region in which the auxiliary circuit board is overlapped with the bracket of the first camera module and/or a region in which the auxiliary circuit board is overlapped with the bracket of the second camera module are/is provided with a material removal portion whose depth is less than a thickness of the region on a lower surface, so that the auxiliary circuit board is partially suspended, and a portion in which the bracket of the first camera module and/or a portion in which the bracket of the second camera module are/is overlapped with the auxiliary circuit board are/is accommodated via the material removal portion.

3. The camera module structure according to claim 2, wherein the auxiliary circuit board is offset to the first camera module or the second camera module with respect to the spacing portion, and the material removal portion is located on one side of the auxiliary circuit board; or
the auxiliary circuit board is centrally disposed with respect to the spacing portion, and the material removal portion is formed on each of two sides of the auxiliary circuit board.

4. The camera module structure according to claim 3, wherein the material removal portion is located in a corner region of a lower surface of the auxiliary circuit board, and a non-material removing portion of the lower surface of the auxiliary circuit board is in an "L" shape or a "⊥" shape.

5. The camera module structure according to claim 4, wherein a length of the material removal portion is ½ to ⅘ of a length of the auxiliary circuit board; and/or the material removal portion is 0.2-0.5 mm in depth.

6. The camera module structure according to claim 1, wherein a lower surface of the auxiliary circuit board is provided with solder joints on a non-material removing portion, and is electrically connected to the mainboard via the solder joints.

7. The camera module structure according to claim 6, wherein a material removal portion of the auxiliary circuit board is a non-wiring region, and a partially suspended portion of the auxiliary circuit board is a wiring region.

8. The camera module structure according to claim 1, wherein a sum of a thickness of the TOF device and a thickness of the auxiliary circuit board is less than or equal to a height of the first camera module and the second camera module beyond the mainboard.

9. The camera module structure according to claim 1, wherein the auxiliary circuit board is in a rectangular shape, an upper half portion of the auxiliary circuit board is partially overlapped with the spacing portion, and a lower half portion of the auxiliary circuit board extends beyond the spacing portion.

10. The camera module structure according to claim 1, wherein the auxiliary circuit board comprises at least two layers of circuit boards which are overlapped, a lower-layer circuit board comprises a notch corner, to form a material removal portion, and the TOF device is disposed on an upper-layer circuit board; and the upper-layer circuit board is electrically connected to the lower-layer circuit board, and the lower-layer circuit board is electrically connected to the mainboard.

11. An electronic device, comprising:
a housing and/or a display screen, wherein the housing and/or the display screen are/is provided with a camera region, the camera region is provided with a camera module, and the camera module has a camera module structure, wherein the camera
module structure comprises:
a mainboard, a first camera module, a second camera module, and a time of flight (TOF) device, wherein the TOF device is located between the first camera module and the second camera module, the mainboard is provided with a first mounting portion and a second mounting portion that are hollowed-out, and the first camera module and the second camera module each are provided with a bracket and are respectively mounted to the first mounting portion and the second mounting portion via the brackets; and the mainboard comprises a spacing portion for separation between the first mounting portion and the second mounting portion, the TOF device is disposed on an upper surface of an auxiliary circuit board, a width of the auxiliary circuit board is greater than a width of the spacing portion, the auxiliary circuit board is located on an upper surface of the mainboard, and the auxiliary circuit board is connected to the mainboard and at least partially overlapped with the spacing portion.

12. An electronic device, comprising:
a housing and/or a display screen, wherein the housing and/or the display screen are/is provided with a camera region, the camera region is provided with a camera module, and the camera module has a camera module structure; wherein the camera module structure, comprises:
a mainboard, a first camera module, a second camera module, and a time of flight (TOF) device, wherein the TOF device is located between the first camera module and the second camera module, the mainboard is provided with a first mounting portion and a second mounting portion that are hollowed-out, and the first camera module and the second camera module each are provided with a bracket and are respectively mounted to the first mounting portion and the second mounting portion via the brackets; the mainboard comprises a spacing portion for separation between the first mounting portion and the second mounting portion, the TOF device is disposed on an upper surface of an auxiliary circuit board, a width of the auxiliary circuit board is greater than a width of the spacing portion, the auxiliary circuit board is located on an upper surface of the mainboard, and the auxiliary circuit board is connected to the mainboard and at least partially overlapped with the spacing portion; a region in which the auxiliary circuit board is overlapped with the bracket of the first camera module and/or a region in which the auxiliary circuit board is overlapped with the bracket of the second camera module are/is provided with a material removal portion whose depth is less than a thickness of the region on a lower surface, so that the auxiliary circuit board is partially suspended, and a portion in which the bracket of the first camera module and/or a portion in which the bracket of the second camera module are/is overlapped with the auxiliary circuit board are/is accommodated via the material removal portion.

13. The electronic device according to claim 12, wherein the auxiliary circuit board is offset to the first camera module or the second camera module with respect to the spacing portion, and the material removal portion is located on one side of the auxiliary circuit board; or
the auxiliary circuit board is centrally disposed with respect to the spacing portion, and the material removal portion is formed on each of two sides of the auxiliary circuit board.

14. The electronic device according to claim 13, wherein the material removal portion is located in a corner region of a lower surface of the auxiliary circuit board, and a non-material removing portion of the lower surface of the auxiliary circuit board is in an "L" shape or a "⊥" shape.

15. The electronic device according to claim 14, wherein a length of the material removal portion is ½ to ⅘ of a length of the auxiliary circuit board; and/or the material removal portion is 0.2-0.5 mm in depth.

16. The electronic device according to claim 12, wherein a lower surface of the auxiliary circuit board is provided with solder joints on a non-material removing portion, and is electrically connected to the mainboard via the solder joints.

17. The electronic device according to claim 12, wherein the material removal portion of the auxiliary circuit board is a non-wiring region, and a partially suspended portion of the auxiliary circuit board is a wiring region.

18. The electronic device according to claim 12, wherein a sum of a thickness of the TOF device and a thickness of the auxiliary circuit board is less than or equal to a height of the first camera module and the second camera module beyond the mainboard.

19. The electronic device according to claim 12, wherein the auxiliary circuit board is in a rectangular shape, an upper half portion of the auxiliary circuit board is partially overlapped with the spacing portion, and a lower half portion of the auxiliary circuit board extends beyond the spacing portion.

20. The electronic device according to claim 12, wherein the auxiliary circuit board comprises at least two layers of circuit boards which are overlapped, a lower-layer circuit board comprises a notch corner, to form the material removal portion, and the TOF device is disposed on an upper-layer circuit board; and the upper-layer circuit board is electrically connected to the lower-layer circuit board, and the lower-layer circuit board is electrically connected to the mainboard.

* * * * *